(12) United States Patent
Zhao et al.

(10) Patent No.: US 8,261,988 B2
(45) Date of Patent: Sep. 11, 2012

(54) PHASE LOCKED IR ENCODING FOR PEENED 2D BARCODES

(75) Inventors: Yonghui Zhao, Penfield, NY (US); Edward Chapman, Rochester, NY (US); Shen-Ge Wang, Fairport, NY (US); Martin E. Hoover, Rochester, NY (US); Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 388 days.

(21) Appl. No.: 12/627,163

(22) Filed: Nov. 30, 2009

(65) Prior Publication Data

US 2011/0127331 A1  Jun. 2, 2011

(51) Int. Cl.
*G06K 7/10* (2006.01)
(52) U.S. Cl. ............... 235/462.09; 235/472.03
(58) Field of Classification Search ............. 235/494, 235/462.01–462.45, 472.01–472.03, 470, 235/488
See application file for complete search history.

(56) References Cited

U.S. PATENT DOCUMENTS

| | | | | |
|---|---|---|---|---|
| 5,734,752 A * | 3/1998 | Knox | ............ | 358/3.28 |
| 5,790,703 A * | 8/1998 | Wang | ............ | 358/3.28 |
| 6,641,053 B1 * | 11/2003 | Breidenbach et al. | ........ | 235/494 |
| 7,913,920 B2 * | 3/2011 | Chen et al. | ............ | 235/494 |
| 7,926,730 B2 * | 4/2011 | Auslander et al. | ............ | 235/494 |
| 2006/0283962 A1* | 12/2006 | Silverstein | ............ | 235/494 |
| 2007/0275189 A1* | 11/2007 | Phillips et al. | ............ | 428/29 |

* cited by examiner

*Primary Examiner* — Thien M Le
(74) *Attorney, Agent, or Firm* — Fay Sharpe LLP

(57) ABSTRACT

A system reveals a 2D barcode in a document. A 2D barcode generator selects the placement and at least one colorant combination of an image and at least one colorant combination for a 2D barcode on a document, where the at least one colorant combination of the image and the 2D barcode form a metameric pair. A print system receives data from the 2D barcode generator and places the image and the 2D barcode on the document. A light source selected or tuned to a wavelength corresponding to the colorant combinations utilized by the print system reveals the 2D barcode placed thereon. A decoding element decodes and extracts data from the revealed 2D barcode.

20 Claims, 9 Drawing Sheets

PHASE LOCKED IR ENCODING FOR PEENED 2D BARCODES

BACKGROUND

The present disclosure broadly relates to placing 2D barcodes on documents via metameric colorant combinations. The barcodes can be subsequently distinguished from a background via appropriate IR lighting, utilizing techniques similar to decoding dot peened 2D barcodes. It is to be appreciated, however, that the exemplary embodiments are also amendable to other like applications.

Barcodes are an essential part of communication, tracking and verification of data in today's commerce. Information such as a model number, a manufacturer ID, a part number, a date, a time, etc. can be encoded via a predefined configuration of elements that comprise the barcode. For 1-dimensional (1D) barcodes, data is encoded via widths (lines) and spacings of parallel lines. For 2-dimensional (2D) barcodes, data is encoded via a placement of geometric barcode elements (squares, dots, hexagons, etc.) within a predefined space. Placement can be accomplished via a number of means such as transfer of ink onto a paper substrate, dot-peening of a metal substrate, etc.

2D barcodes are used in a plurality of industries including manufacturing, postal, transportation, government, healthcare, retail and automotive. There are several standards that have been developed for each industry to provide appropriate data encoding including PDF417, QR Code, Aztec Code, Data Matrix, and MaxiCode, for example. An inherent requirement to decode any 2D barcode standard is a suitable contrast level between elements and non-elements to insure accurate recognition of encoded information. Another requirement of conventional 2D barcodes is space to allow placement of the barcode on a substrate. Such placement can create a visual distraction and/or displacement of other information that is of equal or greater importance than the data encoded within the 2D barcode.

Consequently, a strong desire exists to facilitate placement of the barcodes without hindering placement of other information. In one example, particular inks (e.g., clear/invisible infrared ink, UV fluorescent ink, etc.) allow integration of the inks as part of a document design without making the barcode visible or distracting. The use of such conventional invisible inks, however, can result in additional cost or poor contrast between elements that degrades the ability to properly decode these marks. In some cases, the contrast can be a factor of six times lower than standard visible inks, rendering conventional invisible inks unsuitable for consistent accurate data recovery.

Thus, systems and methods are needed to facilitate accurate and consistent encoding and decoding of 2D barcodes that meet particular aesthetic requirements.

BRIEF DESCRIPTION

In one aspect, a system reveals a 2D barcode in a document. A 2D barcode generator selects the placement and at least one colorant combination of an image and at least one colorant combination for a 2D barcode on a document, where the at least one colorant combination of the image and the 2D barcode form a metameric pair. A print system receives data from the 2D barcode generator and places the image and the 2D barcode on the document. A light source selected or tuned to a wavelength corresponding to the colorant combinations utilized by the print system reveals the 2D barcode placed thereon. A decoding element decodes and extracts data from the revealed 2D barcode.

In another aspect, a method is used to decode a printed 2D barcode. At least one colorant combination is derived for an image and for dots within a 2D barcode on a document, where the at least one colorant combination of the image and the dots of the 2D barcode form a metameric pair. The image and the 2D barcode are printed onto a document, which is exposed to a particular bandwidth light source with a spectral power distribution that maximizes the visual distinction between the image and the dots of the 2D barcode. The visible narrow band illumination is utilized to decode an exposed 2D barcode generated from the image.

In yet another aspect, a method generates a printed 2D barcode. At least one CMYK colorant pattern is selected for printing that includes a comparatively strong black component. A second CMYK colorant pattern is derived, which does not include a black component or only a weak black component, with the property of appearing substantially similar to the first pattern under broadband illumination, but distinct from the first pattern under a selected bandwidth illumination. For simplicity we will label these two cases in an idealized way, referring the presence and absence of a black component. The two colorant patterns are printed in close spatial proximity to produce a 2D barcode that is concealed under broadband illumination and revealed under the selected bandwidth illumination. The first and second colorant patterns are printed via a zero degree fill structure and a matching frequency and phase.

DETAILED DESCRIPTION

Figure 1:
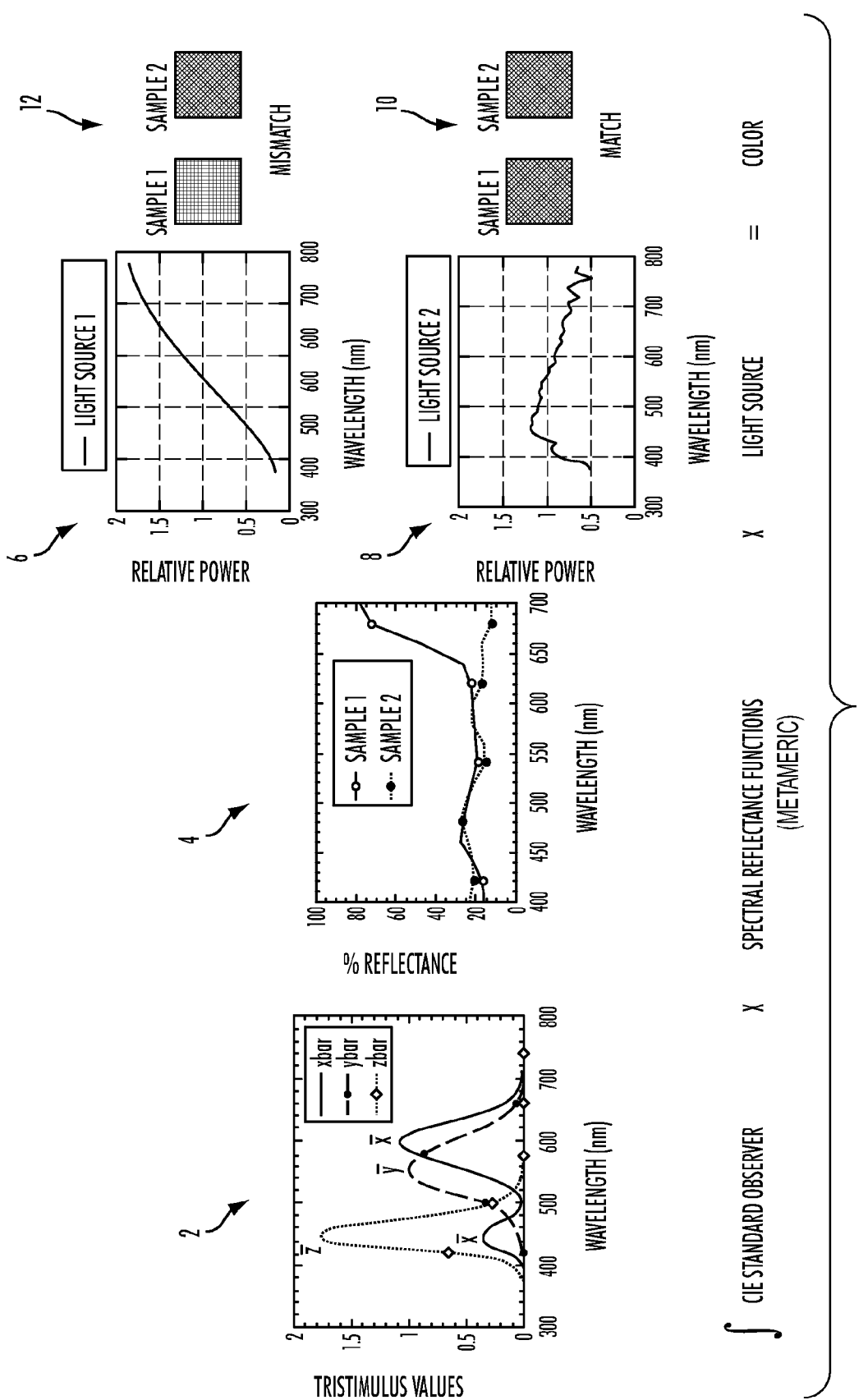
FIG. 1 illustrates color perception of a metameric pair based on a standard observer within the CIE color space, in accordance with an exemplary embodiment.

The term "data" refers herein to physical signals that indicate or include information. An "image," as a pattern of physical light or a collection of data representing said physical light, may include characters, words, barcodes and text as well as other features such as graphics. A "digital image" is by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably.

In a digital image composed of data representing physical light, each element of data may be called a "pixel", which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image. The binary form, gray scale form, and color coordinate form are each a two-dimensional array defining an image. An operation performs "image processing" when it operates on an item of data that relates to part of an image. "Contrast" is used to denote the visual difference between items, data points, and the like. It can be measured as a color difference or as a luminance difference or both. A digital color printing system is an apparatus arrangement suited to accepting image data and rendering that image data upon a substrate.

The current embodiment relates to utilizing infrared (IR) illumination to reveal information hidden by metameric-based rendering techniques. An "infrared mark" refers to a 2D barcode embedded in the image that has the property of being relatively indecipherable under normal light, and yet decipherable under IR illumination by appropriate IR sensing devices, such as IR cameras. Metameric-based embedding techniques can result in different spectral reflectance functions for the same desired color.

As utilized herein, the term "color" refers to visual sensation of color stimulus, or the perception of color. In measurement terms, this refers to the colorimetric value as opposed to spectral reflectance. The term "colorant" refers to one of the fundamental subtractive C, M, Y, K, primaries, (cyan, magenta, yellow, and black), which can be realized in formulation as, liquid ink, solid ink, dye, or electrostatographic toner. A "colorant mixture," in one example, is a particular combination of C, M, Y, K colorants. It is to be understood, however, that more than four colorants can be used in printing and these cases are explicitly included in the scope of metameric rendering. Important for all colorants in the context of metameric rendering is that they have a visual appearance and that appearance is used in the rendering of the visual information.

This use of colorants is in stark contrast to the common mode of infrared (or ultraviolet) rendering, where colorants are selected that are invisible to a human and thus not used in color rendering. It is also important to notice one advantage of the present system, namely that the total number of colorants that need to be handled is identical to the number of colorants used for color rendering, despite having an additional information channel through the metameric nature of the infrared. For example, a common four color printing process that intends to add an infrared marking would need to be converted to a five channel process. In the subject embodiments, however, additional channels are not necessary and thus provide greater efficiency and better utilization of the machine.

"Metameric rendering/printing" refers to the ability to use multiple colorant combinations to render a single visual color, as can be achieved when printing with more than three colorants. In the event that one term or the other is deemed to be narrower or broader than the other, the teaching as provided herein and claimed below is directed to the more broadly determined definitional term, unless that term is otherwise specifically limited within the claim itself.

FIG. 1 illustrates color perception based on a standard observer within the International Commission on Illumination (CIE) color space. A plot 2 illustrates a color matching function of a CIE standard observer. The typical human eye has three types of cells, called cones, for detecting light and color under normal viewing conditions. The three types of cone cells correspond to detecting short (S), middle (M), and long (L) wavelengths. Thus, in principle, only three parameters are necessary to describe a color sensation. The spectrum from a surface color can be referred to as multiplication of a spectral reflectance function (SRF) of the surface and a spectral power distribution (SPD) of the light source illuminating the surface. Multiplying this product by the spectral sensitivities of the three cone cells results in three values being presented to the brain which represent the perceived color, and thus color is three-dimensional.

Tristimulus values of a color are the amounts of three primary colors in a three-component additive color model needed to match a test color. The tristimulus values are denoted X, Y, and Z. Two colored regions, made up of different mixtures of various wavelengths, may appear to be the same color; this effect is called metamerism. Two colored regions have the same apparent color to an observer when they have the same tristimulus values under different light sources, no matter what spectral distributions were used to produce them. Two such colored regions are known as metamers or a metameric pair.

Due to the nature of the distribution of cones in the eye, the tristimulus values depend on the observer's field of view. To eliminate this variable, the standard observer is employed and is characterized by three color matching functions. The color matching functions are the numerical description of the chromatic response of the observer, as described above. A set of three color-matching functions, called $\bar{x}(\lambda)$, $\bar{y}(\lambda)$, and $\bar{z}(\lambda)$, are set forth in the plot 2. These color matching functions represent spectral sensitivity curves of three linear light detectors that yield the tristimulus values X, Y, and Z. The tabulated numerical values of these functions are known collectively as the CIE standard observer.

The tristimulus values for a color with a spectral power distribution $I(\lambda)$ are given in terms of the standard observer by:

$$X = \int_0^\infty I(\lambda)\bar{x}(\lambda)d\lambda \tag{1}$$

$$Y = \int_0^\infty I(\lambda)\bar{y}(\lambda)d\lambda \tag{2}$$

$$Z = \int_0^\infty I(\lambda)\bar{z}(\lambda)d\lambda \tag{3}$$

where $\lambda$ is the wavelength of electromagnetic radiation (typically measured in nanometers).

A plot 4 shows spectral reflectance functions (SRF) for a sample 1 and a sample 2. The spectral reflectance for both samples is about twenty percent from about 400-650 nm. From about 650-700 nm, however, the reflectance of sample 1 rises sharply to about eighty percent reflectance. Within this same bandwidth, the reflectance of sample 2 remains the same. Regardless of this disparity, the multiplication and integration of the different spectra for sample 1 and sample 2 by the same detector spectral response can give the same value. As sample 1 and sample 2 appear the same for two SRFs, a particular SPD, and all three cones, sample 1 and sample 2 are metamers.

A first light source and a second light source can be used to illuminate the samples 1 and 2. The first and second light sources have SPDs 6 and 8 respectively. The SPD 6 of the first light source has a highest relative power output from 600-800 nm. The SPD 8 of the second light source has the greatest relative power output between around 400-500 nm. The second light source does not produce observable color discrimination between the sample 1 and the sample 2, as shown in a color match 10. Color discrimination is not realized since the second light source has an SPD with very little power where the SRFs of the samples are significantly different.

In contrast, when the first light source is employed, an observable color difference is obtained between the sample 1 and the sample 2 metamers. This disparity is shown as a color mismatch 12 and is a result of the first light source having an SPD with significant power where the SRFs of the samples are significantly different. The selection of a proper bandwidth illumination creates discrimination between metameric colors. Thus, the bandwidth of an illuminant to create color discrimination can directly depend on colorants employed to print respective samples.

Particular bandwidth light sources are utilized to highlight or accentuate spectral reflectance differences. In one example, a 2D barcode is revealed only when illuminated via a light source with a particular bandwidth. Optimization can be employed to design an illumination source to accentuate a given metameric pair, such as an image and a 2D barcode within a document. Alternatively, the metameric pair and illumination source can be jointly optimized to provide desirable properties in both wideband and narrow band illumination. An embodiment uses color light-emitting diodes (LEDs) as a type of illumination source. Such devices are advantageous as they are inexpensive and commercially available for a large set of peak wavelengths within the visible spectrum. A particular embodiment of LED emits light in an infrared or ultraviolet wavelength range.

Within the CMY color space (e.g., 4-color printing), any hue angle can be achieved by combining two of the three primary colors. The purpose of the third color is to move the hue towards grey (e.g., decrease saturation), and is known as the greying agent. However, as that greying agent has an inherent hue of its own, it also shifts the hue as it changes the saturation of the resulting color. The most efficient way to change the saturation of a given color while maintaining the same hue angle is to use the K (Black) component. The act of substituting a quantity of black for a quantity of the greying agent is known as grey component replacement (GCR).

A 2D barcode can be created via a choice of differing GCR strategies within an image upon which it is placed. This disparity can result in two different spectral reflectance functions (SRFs) for a given target color that are calculated to match for a given light source or illuminant (e.g., CIE D50, D55, D65, etc.). When a light source is different from the given light source or illuminant, however, the match will likely not hold exactly. The effect is quite subtle for most white light sources. If the light source is carefully selected to have its power in the regions of the spectrum where the two SRFs have maximum difference, however, a color difference between them can be readily seen. This desired discrimination necessitates selecting illumination SPDs to cause high degree of color mismatch between two otherwise matching samples.

It is understood that in the case of light source illumination, the terms "seen," "revealed," etc. are meant to refer to optical sensors that have a sensitivity commensurate with the wavelength range of the light source and/or colorants. In general, throughout this application, metameric colorant pairs are employed that, under common illumination or illuminations, are a metameric match or approximate metameric match to a human observer. The same metameric colorant pairs can simultaneously be a strong mismatch when using a particular sensor under a particular light source. In one example, an infrared sensor is employed to detect such metameric colorants under common infrared illumination. This differs from a commonly used definition of metameric pairs which only considers human observers. In contrast, an approximate metameric match to a human observer is desired over many illuminants, wherein the metameric difference only appears under special illumination, such as an infrared light source for example.

Two inks that are metameric pairs can be selected to create 2-D barcodes on paper. In one embodiment, the 2D barcode has similar properties to dot-peened marks on metal under appropriate lighting conditions. Unlike a 2D barcode typically produced on paper, a dot-peened barcode does not require that pixels are filled 100 percent. In one common application, square-shaped pixels are used to create a 2D barcode, wherein a majority of each "on" pixel is filled via a circular mark. These 2D barcodes are decoded by focusing on the center of each pixel, under particular lighting, to accurately determine each pixel state.

In one embodiment, the 2D barcode is created with two metameric inks that meet three conditions. First, a zero degree angle halftone fill structure is employed, although higher harmonics are contemplated. Second, the frequency and phase for the halftone are matched for both inks. Third, only one of the inks (metameric quadruplet) has a K component. Variations can exist wherein one ink has a high percentage and the other ink has a very low percentage of K. An alternative embodiment is to include a large amount of K or a combination of C, M and Y that provides a very dark color whereas the other ink in the pair contains very little carbon black or a very light combination of C, M and Y to provide the greatest contrast for the dots that are placed on paper.

The limitations for high and low percentage can relate to a minimum desired contrast to facilitate accurate, repeatable decoding of the 2D barcode when subjected to a particular (e.g., IR) light source. The contrast is created since carbon black (K) absorbs light and appears as a black dot. In contrast, the CMY (cyan, magenta and yellow) colors on paper can simply reflect light and appear as a very light or white color under the light source. Thus, the inclusion of K in only one ink can create a high-contrast black-on-white appearance when exposed to appropriate lighting, as discussed in further detail below. In one example, the light source emits light in the infrared spectrum with a wavelength of 840 nanometers or greater.

It is to be appreciated, however, that the metameric pairs can be created ways other than varying the GCR strategy, and that the present technique is suitable for decoding any method of embedding that relies on the use of metamers to hide information in an image. In another approach, additional colorants can be used such as extended gamut colorants (e.g., orange, red, green, purple, violet) and photo tone colorants (e.g., light cyan, light magenta, light black, dark yellow), again maintaining the essential property that the colorant also has an appreciable visual component and is used as part of the standard color rendering. The subject embodiments can be employed with substantially any application including extended gamut applications and/or with disparate colorants.

Figure 2:
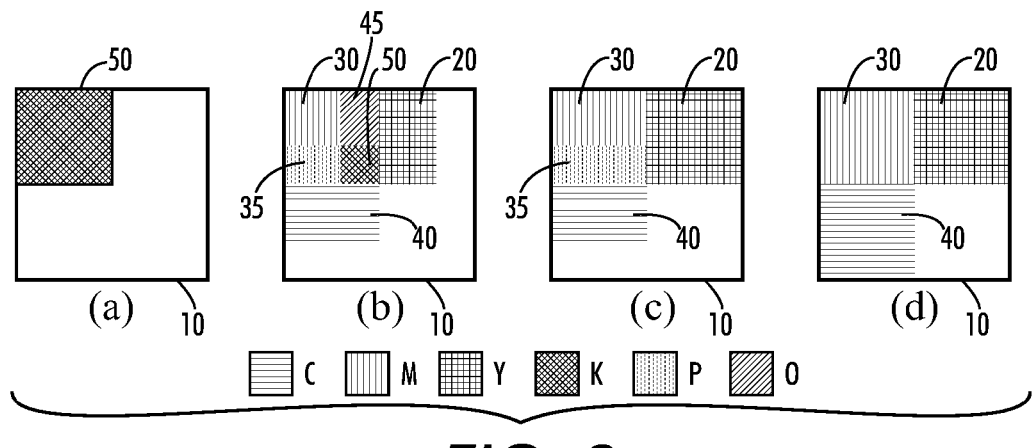
FIG. 2 schematically depicts idealized metameric situations where different colorant combinations and distributions lead to identical visual impression under normal illumination, in accordance with an exemplary embodiment.

FIG. 2 depicts an exemplary conceptualization of metameric printing for a human observer. The visual response for a human observer is in most practical applications described sufficiently with a three component system, such as that defined by the CIE. In an idealized system with ideal toners, all four areas 10 of (a), (b), (c), and (d) of FIG. 2 will result in the same visual response under normal illumination, as discussed above. Inside the predetermined area 10, different amounts of yellow 20, magenta 30, cyan 40 and black 50 colorant are deposited, as in a standard four color printing process. Also, dependent on the overlap provided with the different colorants, the mixtures blue 35 and red 45 are created from cyan 40 and magenta 30, or yellow 20 and magenta 30 respectively.

Figure 3:
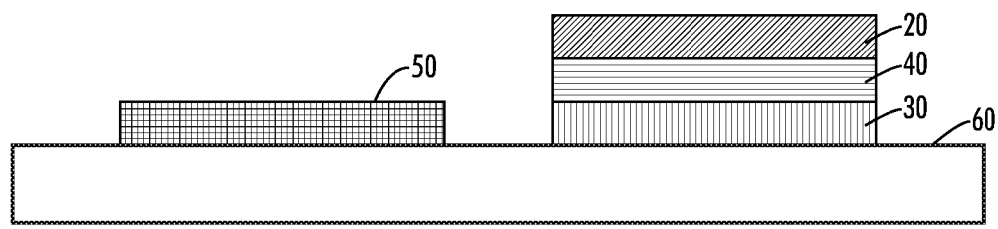
FIG. 3 schematically depicts in cross-sectional profile two instances where a single visual color black is achieved with different colorant combinations, in accordance with an exemplary embodiment.

FIG. 3 in cross-section conceptually shows different ways in which the visual color black can be achieved either by using a black colorant 50, or in the alternative by the superposition of yellow 20, magenta 30, and cyan 40, colorants as printed onto the substrate print surface 60. The important aspect depicted by FIG. 3 is that a single color, in this case black, can be achieved by a multitude of metameric colorant combinations, of which but two are shown in this example. In general, every system that maps N components to n components with N>n, will have a multitude of ways to accomplish this mapping. It is understood by those skilled in the art that singularities might exist in the mapping so that certain visual triplets can only be achieved with a single or a small number of colorant quadruplets. Again, as will be understood by those skilled in the art, utilization of more than the standard four colorants is comprehended and contemplated in the claims below, and only omitted for clarity of explanation as being redundant and unnecessary for those skilled in the art.

As is provided by example in FIG. 3, the same visual color can be achieved with different amounts and combinations of the respective available colorants. The infrared characteristics of individual colorants, however, have not been discussed. From FIGS. 2(c) and (d) it should be clear from noting the overlap of magenta 30 and cyan 40 in (c), that the same amount of colorants have been used and all that has been changed is the spatial distribution only. In examples provided in FIGS. 2(a) and (b) however, the black colorant 50 provided there could conceptually be replaced by a superposition of the three colorants yellow 20, magenta 30 and cyan 40 as is indicated in FIG. 3 without changing the visual perception of the color.

Under standard illumination, a human observer would not be able, during normal observation scenarios, to distinguish the way a rendered color was produced from amongst the various achievable colorant combinations. This commonly understood effect is often employed to select the best colorant that also favors some secondary requirement, such as: materials use, cost, stability, and the like. Indeed, as will be readily noted by those skilled in the art, under-color removal is often employed so as to maximize black, and minimize C, M and Y colorant usage, so as to thereby minimize the cost for rendering a given color page.

Figure 4:
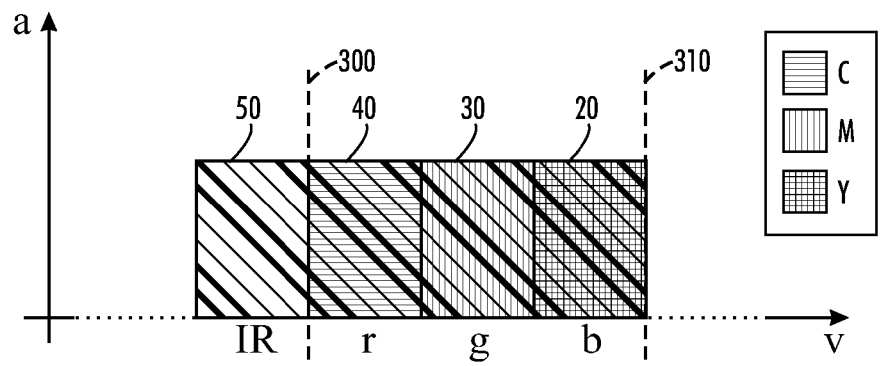
FIG. 4 provides a simplified depiction of idealized absorption for different colorants, in accordance with an exemplary embodiment.

FIG. 4 depicts conceptually the absorption levels in spectral frequency bands of different colorant materials in an idealized system. As will be well understood by those skilled in the art, real colorants will deviate somewhat from this depicted idealized behavior, but here for the sake of clarity in explanation, it is assumed that all colorants have absorption across unique frequency bands as shown. As further shown in FIG. 4: yellow 20 absorbs blue (b) while reflecting the red (r) and green (g) light components; magenta 30 absorbs green, while reflecting red and blue; and cyan 40 absorbs red while reflecting green and blue. Thus, yellow absorbs in the blue spectra band, magenta absorbs in the green spectra band and cyan absorbs in the red spectra band. The important point to be made in FIG. 4 is that in general, black 50 as is indicated here by the diagonal lines, absorbs across all the red, green and blue, spectral bands, but also extends further down into the IR spectral region. The IR spectral region is delineated here to be that band to the left of dashed line 300. This empirically observed effect appears to be the resultant of the typical and common utilization of carbon black in the manufacture of black colorants.

As taught in the prior art directed to invisible infrared encoding, due to the absorption characteristics of carbon black in the infrared region, utilization of carbon black is commonly considered as inappropriate and is discouraged. This results in the art teaching the use of non-carbon black toners, as is achieved by mixing other colorants as discussed above. For the purpose of teachings provided and claimed herein, we will limit our meaning of "black colorant" to be that typical usage of standard black (K) colorants having strong properties in both the visible and the infrared region, as set forth in Table 1 below.

TABLE 1

| Toner Colorant | IR Reflectance on Substrate | Perceived Intensity Absorption or Perceived Luminance Impact |
|---|---|---|
| Black | Minimal | High |
| Cyan | High | High |
| Magenta | High | Medium |
| Yellow | High | Low |

It is understood that for the purpose of the teachings provided herein, the usage of the term "reflectance" as a characteristic is always considered as including the effects of the substrate 60 to which the rendered colorant is applied, and thus a high reflectance commonly refers to a transparent colorant for that wavelength regime applied to a highly reflective substrate.

The teachings as noted and described above when suitably employed, can present in combination with the teachings to follow below, an infrared-based 2D barcoding technique that as taught herein, need only use common consumables. This exemplary technique finds foundation on the following observations: 1) common substrates used in digital printing are high infrared reflectors; 2) common cyan, magenta, yellow and other chromatic colorants are highly transmissive to infrared; 3) the common black colorant exhibits a strong infrared absorption, thus strongly reducing or even eliminating infrared reflection. This is because infrared radiation is absorbed before it can reach the reflective substrate surface, as well as any remaining infrared reflections being absorbed on the second return pass back through the black colorant.

This exemplary technique works by finding colorant mask patterns that produce similar R (normal reflection) and are difficult to distinguish from each other under normal light, while providing dissimilar infrared reflections thereby displaying a high contrast from one another under infrared light. This dissimilarity in infrared reflections under IR illumination can be easily detected with a standard infrared sensitive camera. One example embodiment employs this difference by toggling between the black visual color caused by using a black colorant, and the black visual color caused by a combination of the cyan, magenta and yellow colorants, alternating the placement of each between either the background or foreground areas in close spatial proximity and complementary counter-opposition.

Figure 5:
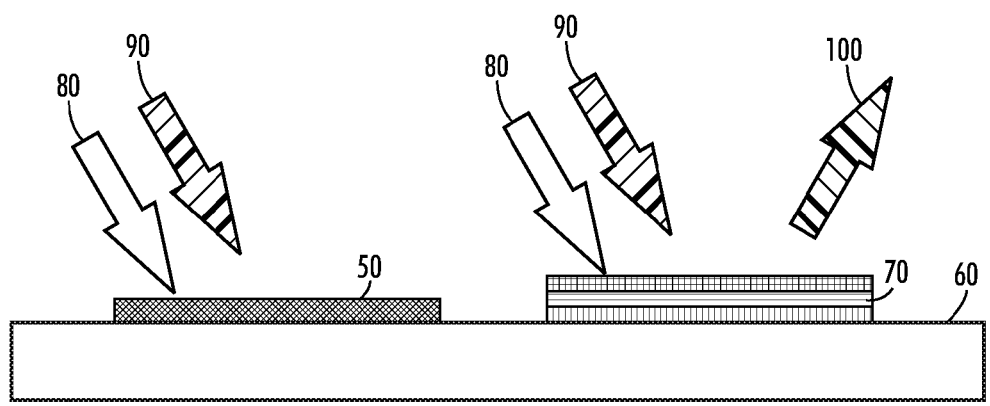
FIG. 5 depicts in cross-sectional profile the different infrared reflections between black colorant and chromatic colorant mixtures on a reflective substrate, in accordance with an exemplary embodiment.

FIG. 5 shows the difference in infrared reflection for the scenario described in FIG. 4. The visible light 80 is absorbed by either black colorant 50 or chromatic colorant mixture 70 and no visible light is reflected from the toner/substrate combination. Infrared radiation 90, however, is absorbed by the black colorant 50 but is transmitted by the chromatic colorant mixture 70 to the substrate 60. The infrared radiation is thus reflected at the substrate 60 and an overall infrared reflection 100 can be detected in the system. It is to be appreciated that the proposed technique is distinct from the conventional approach. Instead of infrared behavior being separated from visually active colorants and added via application of special inks, infrared behavior is modified by selectively altering the colorant mixtures. In this manner, the desired visual color is reproduced at every location, wherein the colorant mixtures are selected in a way that encodes the desired infrared signal.

Figure 6:
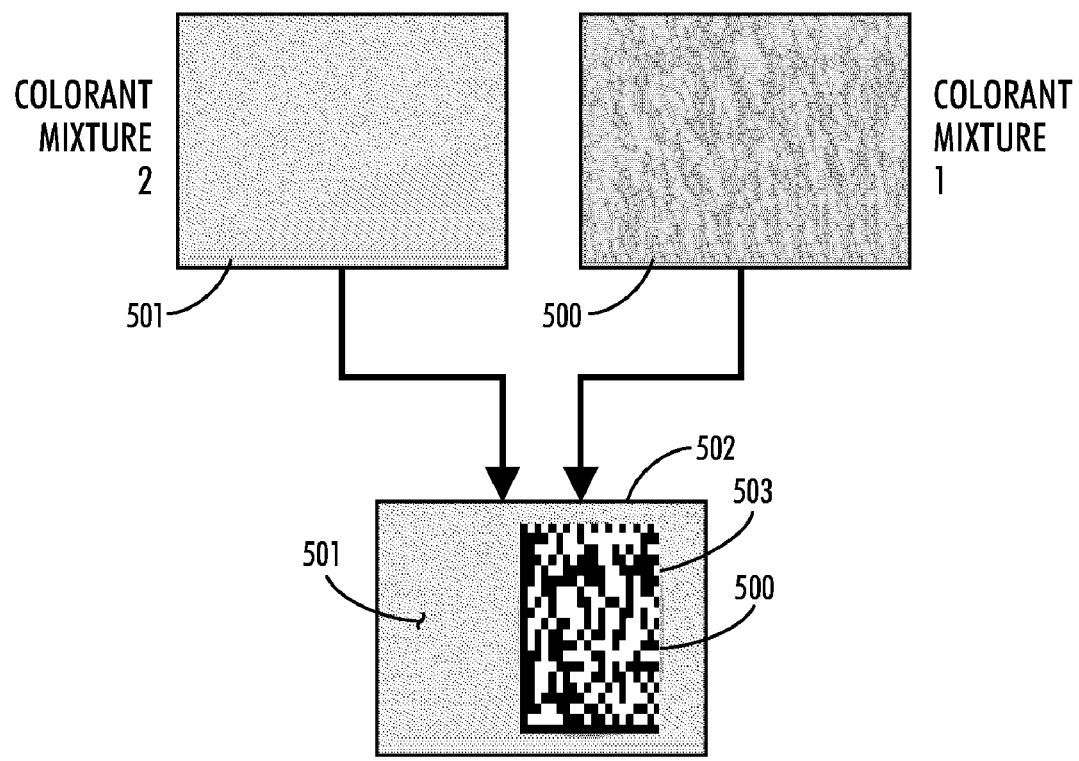
FIG. 6 provides depiction for one approach utilizing colorant or colorant mixtures as applied in the rendering of an example alphanumeric character, in accordance with an exemplary embodiment.

FIG. 6 provides depiction for application of the teachings enumerated above. In FIG. 6, a colorant mixture-1 is selected and applied to patch area 503, which is arranged as an exemplary 2D barcode in this example. Further, a colorant mixture-2 is selected and applied to patch area 502 arranged here in substantially close spatial proximity to patch area 503, and thereby effecting a background around patch area 503. Both colorant mixture-1 and mixture-2 are comprised of suitably selected colorant or colorant mixtures 500 and 501 respectively.

In one embodiment, only one of the colorant mixtures 500 or 501 contains a K component. They will, however, not both be comprised of the same identical single colorant or colorant mixture. In one embodiment, colorant mixture 501 will be selected so as to provide higher infrared absorption/lower infrared reflectance than that selected for colorant mixture 500. However, in a preferred arrangement the colorant mixtures 500 and 501 will be selected most optimally to match each other closely in their average color under normal light, while at the same time differing in their average infrared response. Thus, under normal illumination, area 502 would look to a human observer as a constant or quasi constant color, while under infrared illumination area 502 would separate into two distinct areas represented by colorant mixtures 500 and 501 exhibiting a clear contrast to an infrared sensitive device such as an infrared camera. It should be noted that interchanging the colorant mixtures 500 and 501 simply leads to an inversion of the contrast, e.g.: light pixels on a dark background would change to dark pixels on a light background within the 2D barcode. This inversion is comprehended in the description even if not further explicitly discussed, as being well understood by those skilled in the art.

As a further example, an approximate fifty percent grayscale gray colorant mixture may be realized with a halftone of black colorant only. This may then be matched against a colorant mixture comprising a high amount of yellow mixed with enough cyan and magenta to yield a similar approximate 50% grayscale gray colorant mixture. However, with the given high content of black colorant amount the single colorant halftone case will provide much higher absorption of infrared as compared to the colorant mixture. Thereby two colorant mixtures may be realized which while appearing quite nearly identical under normal viewing illumination, will nevertheless appear quite different to the appropriate device under infrared lighting.

Further, as will be understood by those skilled in the art, this may be approached as an intentional exploitation of metamerism to reproduce the same color response from two different colorant mixtures under normal viewing illumination. Mixtures which are optimized to vary sufficiently in their average infrared absorption and are otherwise a close metameric match under normal room lighting.

The above-described approach while effective, nevertheless may sometimes be discernable under normal illumination to those observers consciously aware and on the lookout for, or expecting an infrared mark based on metameric rendering. This can for example be caused by an incorrect match due to printer imprecision/drift, and/or an incorrect match due to inherent calibration limitations, or based on differences in other colorant attributes, such as gloss. What is described herein below is a further technique which makes an infrared mark that is increasingly difficult and even impossible for an unaided eye to discern absent the necessary infrared set-up, as achieved by the incorporation of a distraction pattern.

Figure 7:
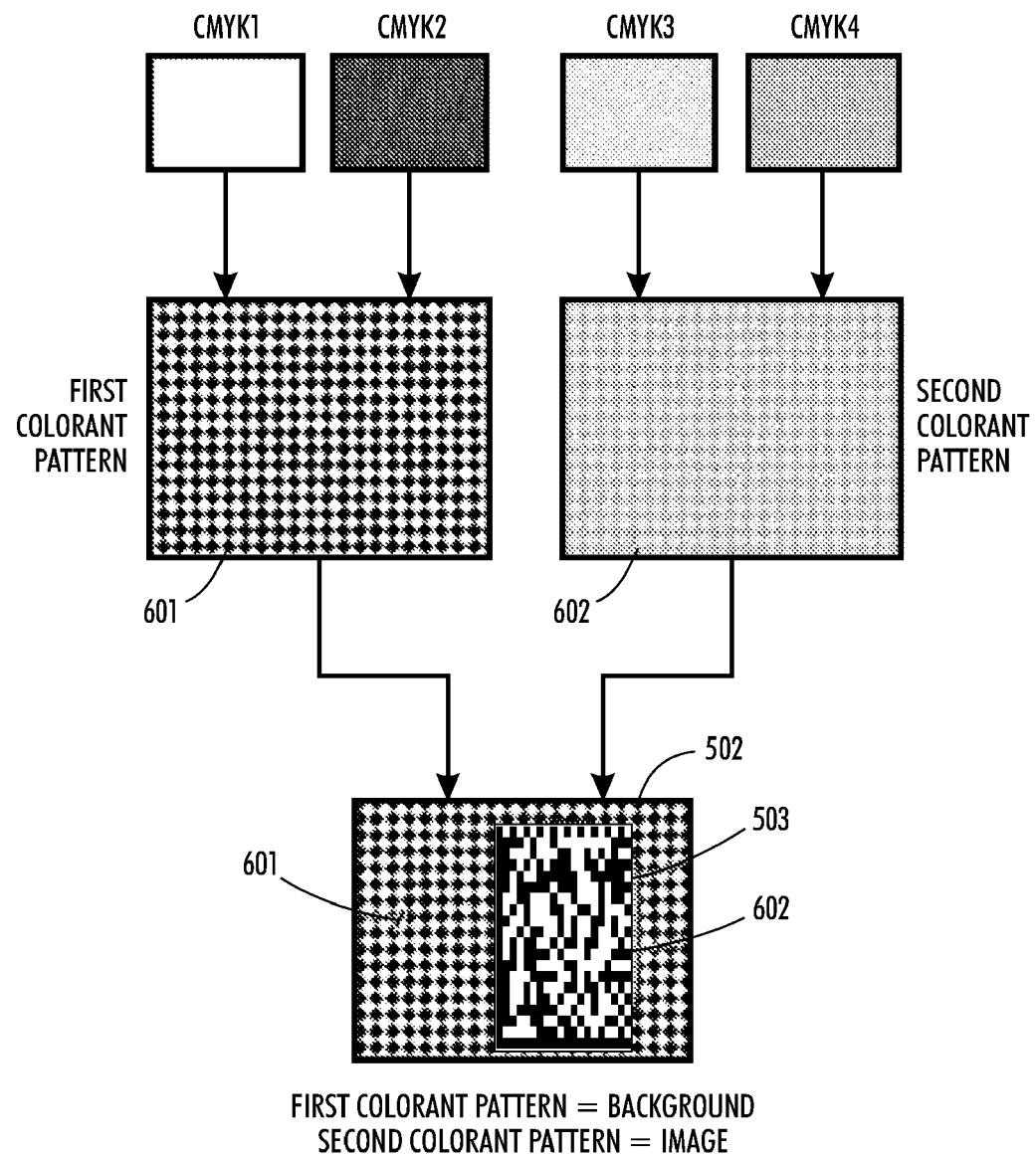
FIG. 7 provides depiction for an alternative approach utilizing colorant or colorant mixtures as applied in the rendering of an example alphanumeric character, in accordance with an exemplary embodiment.

FIG. 7 provides depiction of a further embodiment example. The arrangement here is intended to make any casual observation of an infrared mark more difficult to discern by the lay observer. This is achieved as a consequence of the introduction of a spatial distraction pattern in combination with the differing colorant mixture selections described above. Each resultant color spatial pattern will on average have some given color appearance when viewed under normal light, and will exhibit, on average, some given level of infrared response when viewed under infrared set-up.

Here in FIG. 7, the same example is used again as above, and depicts where one simple type of infrared mark is a 2D barcode. The mark selected here in this figure is arranged as an exemplary 2D barcode in this example, and can be represented as a two-state image—one state for the 2D barcode image and the other state for the background. To construct this two-state image, two spatial color patterns 601 and 602 are provided, each corresponding to one of the two-states. The two spatial colorant patterns are designed to have substantially similar average colors under normal light and yet substantially different infrared light response. In one embodiment, one of the color patterns 601 and 602 contain a K component whereas the other does not. In another embodiment, one of the color patterns 601 and 602 has a very minimal amount of a K component whereas the other pattern has a significant amount of a K component. The two spatial colorant patterns 601 and 602 are each provided preferably as a repeating spatial pattern mosaic combination of one or more colors, each color in turn being itself either a single colorant or a CMYK colorant mixture, with the above referenced K component restriction.

In an exemplary embodiment provided in FIG. 7, there are contemplated four colorant mixtures, indicated as: CMYK1, CMYK2, CMYK3, and CMYK4. Fewer colorant mixtures may be used as will be discussed below, and as will be obvious to one skilled in the art more colorant mixtures may be employed as well. In this embodiment CMYK1, and CMYK2, are used to make up the first spatial colorant pattern 601. In turn CMYK3, and CMYK4, are used to make up the second spatial colorant pattern 602. It is to be appreciated that one of the colorant patterns does not contain a K component. More particularly, either both the colorant mixtures CMYK1 and CMYK2 do not have a K component or both the colorant mixtures CMYK3 and CMYK4 do not have a K component. As one colorant pattern (either 601 or 602) ultimately does not have a K component, pixels within the 2D barcode 602 can be clearly distinguished from the colorant pattern 601.

The distraction pattern actually employed here in this embodiment is a diamond checker-board, but those skilled in the art will recognize the possibility of being able to select any number of other patterns, as for example a simple orthogonal checker-board, or polka-dots. This pattern will act as a distraction to the eye and make it more difficult to discern the swapping between 2D barcode/image and background. The actual distraction pattern granularity size is somewhat variable, flexible and empirical. The correlation between this distraction pattern is important in the generation of barcodes that show a high infrared contrast while being metameric matches to a human. The most optimum results are dependent upon the desired barcode/image size, the target print system to be employed for rendering as well as the visual acuity of the target observer. Exemplary results will be realized when the spatial pattern used is the same or quite similar for both spatial colorant patterns 601 and 602.

Returning to the example provided in FIG. 7, the second spatial colorant pattern 602 is selected and applied to fill patch area 503, which here is arranged in this example as an image depicting an exemplary 2D barcode. Further, the first spatial colorant pattern 601 is selected and applied to patch area 502 arranged here in substantially close spatial proximity to patch area 503, and thereby effecting a background pattern around patch area 503. Both the spatial colorant patterns 601 and 602 are exemplarily arranged so that the pattern appears to be nearly continuous across patch 502 and patch 503. However, while the two spatial colorant patterns are designed to have substantially similar average colors under normal light and substantially different average infrared response, they may nevertheless in one embodiment, have one CMYK colorant mixture in common. For example in FIG. 7, CMYK2 may be identical with CMYK4. This would mean that CMYK1 and CMYK3 would be designed to have substantially similar average color levels under normal light and substantially different infrared response.

It is understood that the description above also holds for cases where the colorants are infrared reflective and not infrared transmissive, since in both cases, a strong infrared reflection can be observed. For cases where the colorants are in themselves reflective, however, the order of colorant deposition becomes important and care has to be taken that the order use does not alter the desired properties. One preferred method nevertheless, is the use of common infrared absorbing black colorants contrasted in close spatial proximity with infrared transmissive chromatic colorants.

Thus as discussed and provided above is a 2D barcode embedded in an image that has the property of being nearly indecipherable by the unaided eye under normal light, and yet can easily be detected with an infrared sensitive device under infrared illumination. This infrared mark comprises an infrared reflecting substrate, and a first spatial colorant mixture pattern printed as an image upon the substrate. The first spatial colorant mixture pattern has the characteristic of low infrared reflectance, as well as a property of low color contrast under normal illumination against a second spatial colorant mixture pattern. The second spatial colorant mixture pattern has a high infrared reflectance, and printed in close spatial proximity to the first colorant mixture pattern, such that the resulting printed image suitably exposed to an infrared illumination, will yield a discernable pattern evident as an infrared mark to the appropriate infrared sensing device.

The above description as of yet does not address some of the peculiarities of barcodes, specifically peen-type barcodes. It is understood from standard four (or N) color printing that the actual colorant deposition on the substrate is governed by a spatial distribution process known as halftoning. That is to say, for a desired colorant coverage of fifty-percent, a certain spatial distribution of that colorant can be used that amounts to a fifty-percent fill. Since halftoning is well known in the art, for the sake or brevity, only certain aspects will be discussed herein as they relate to peen-type barcodes.

Figure 8A:
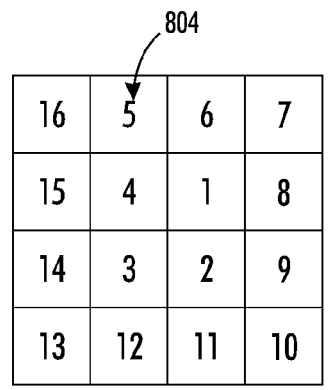
FIGS. 8(a), 8(b) and 8(c) illustrate exemplary fills of pixels within a print area, in accordance with an exemplary embodiment.

FIG. 8(a) shows a rectangular area 802 of 16 pixels 804, labeled according to the fill order for increasing colorant load. In this strongly simplified embodiment, pixels 804 are filled from the center in an outward clockwise spiral, resulting in a completely filled rectangle when 16 pixels utilized. This arrangement is tiled over the entire plane and in this case refers to a zero-degree halftone, since the tiling is along horizontal and vertical axes and not at an angle with respect to them. It is to be appreciated, however, that substantially any fill order within the rectangular area 802 is contemplated.

Figure 8B:
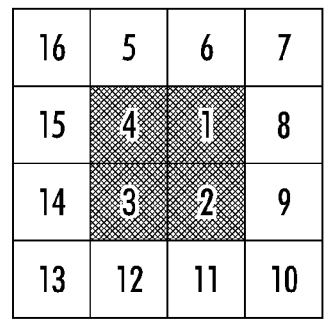
Figure 8C:
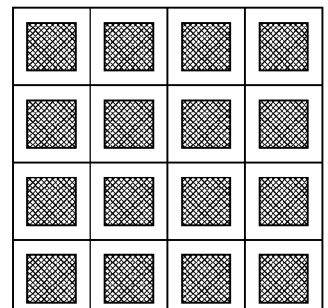

FIG. 8(b) shows the exemplary case of filling the first four pixels 804 and FIG. 8(c) shows the result repeated over a larger array, visualizing the 0° character of the periodic halftone structure. From FIG. 8(c) we can see that every halftone cell of 16 individual pixels is only partially filled with a corresponding colorant indicated, as shown at 806. In normal printing, this is rarely a problem since text is in general not strictly periodic. For barcodes, however, a problem can arise if the halftone structure and the barcode structure are chosen independently. For the metameric rendering case for infrared marking, as set forth herein, the colorant black might be distributed as indicated in FIGS. 8(a)-(c) and, thus, one needs to assure that the barcode information is congruent.

Figure 9A:
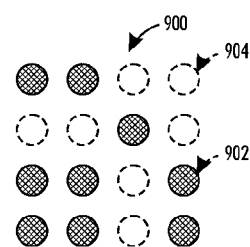
FIGS. 9(a), 9(b), 9(c) and 9(d) illustrate an exemplary peen-type barcode, in accordance with an exemplary embodiment.

FIG. 9(a) shows a stylized peen-type barcode 900, wherein black circles 902 indicate the barcode elements to be printed and the dashed circles 904, the barcode elements that will remain blank. In a continuous tone print system, creation of the barcode 900 can be simply achieved. In half-toned systems, as are common in printing applications, the interaction of the barcode and the periodic halftone structure has to be considered.

Figure 9B:
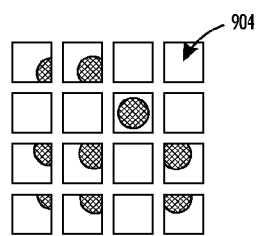
Figure 9C:
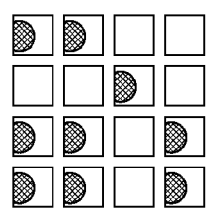

FIG. 9(b) shows the result of mapping the exemplary peen barcode of FIG. 9(a) onto a cell structure that has a different periodicity of the barcode. The squares 910 indicate the area of the halftone cell (corresponding to the area 806 of FIG. 8(c)) that are potential locations for the black colorant. As can be seen from FIG. 9, the peen structure (e.g., black circles 902) is deteriorated due to the interaction with the halftone structure. FIG. 9(c) shows the case where both structures have identical frequency, but the absolute spatial position, or phasing, is not aligned. Again, a deterioration of the peen code is visible.

Figure 9D:
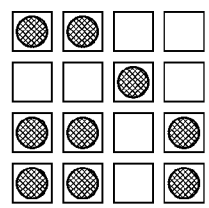

In FIG. 9(d), the above problems are rectified wherein the halftone structure is aligned with the barcode in both frequency and phase, resulting in an optimized barcode printing. It should be noted that this problem is specific to strictly periodic signals and that other barcode types might require a different halftone structure due to their different periodic structure. The essential requirement to align the halftone structure in shape, frequency and phasing to the barcode remains.

Figure 10:
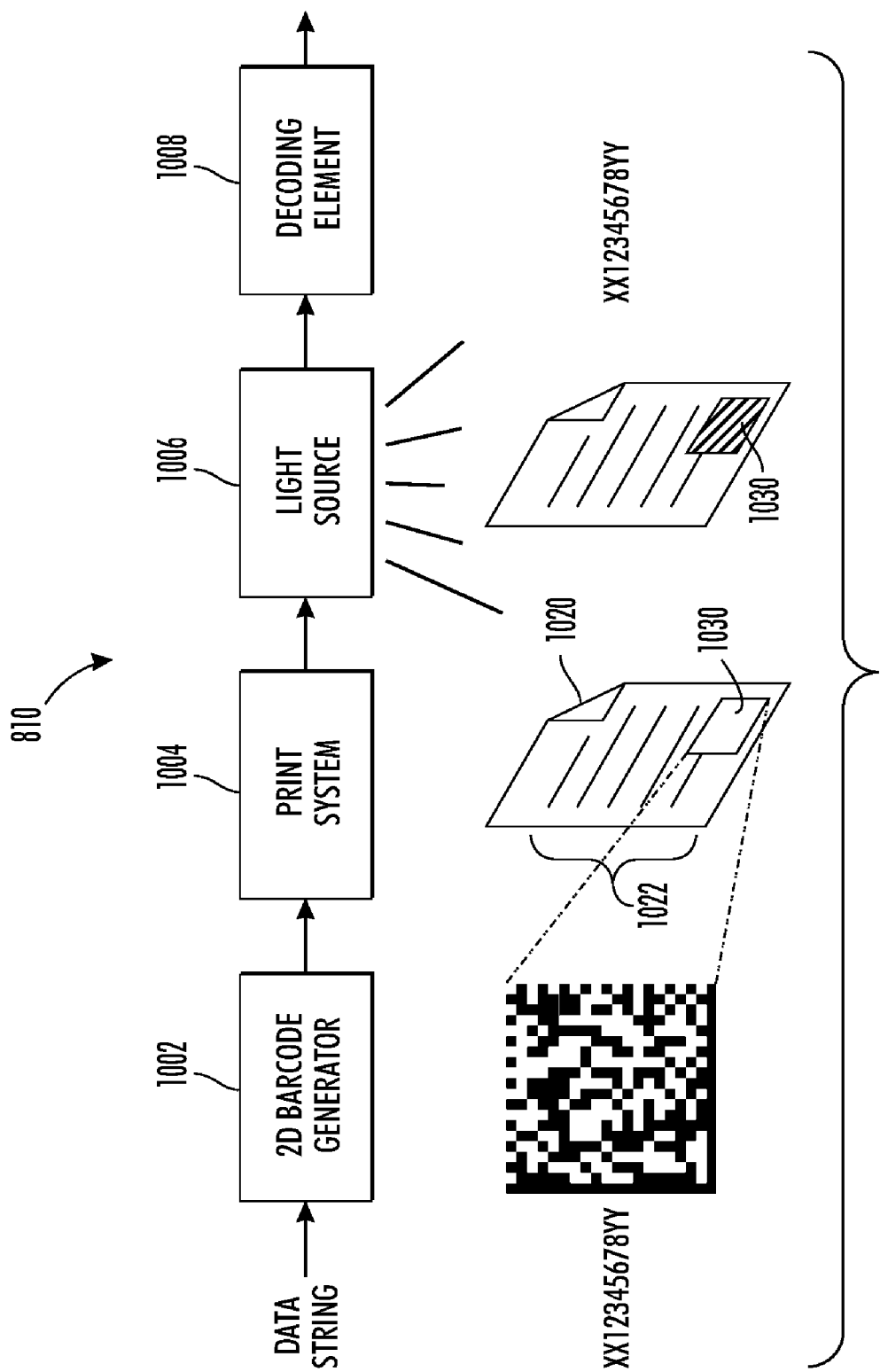
FIG. 10 illustrates a system to decode a 2D barcode placed on a document, in accordance with an exemplary embodiment.

FIG. 10 is a system 1000 that receives input data that is encoded via a 2D barcode generator 1002. The 2D barcode is printed alongside other content onto a document via a print system 1004, wherein the 2D barcode is imperceptible under standard lighting conditions. The document is subsequently exposed to a particular light source 1006 that exposes the 2D barcode, which is read and decoded via a decoding element 1008. The data is extracted from the decoded 2D barcode and output from the system 1000. In one example, two metameric colorants are utilized to print the 2D barcode, which is distinguished when exposed to the light source 1006, as set forth in FIGS. 6 and 7 above.

The 2D barcode generator 1002 can employ an exemplary processing environment such as a computer that includes a memory and a processor to store and execute software to generate 2D barcodes from the input data based on substantially any standard such as a PDF417, QR Code, Aztec Code and Data Matrix, for example. The 2D barcode generator 1002 can determine the size, shape and placement of appropriate geometric elements within the 2D barcode that fit within a suitable prescribed area. In one embodiment, an application requests parameters for the 2D barcode such as size and standard for encoding. From this information, a routine specific to the standard can be executed that converts the data string into the 2D barcode. In particular, one or more alphanumeric characters within the data string can be associated with one or more symbols (pixels) that are presented in locations dictated by the standard utilized. In addition, borders or other graphical elements can be generated and placed to create a datum that is relative to the orientation and location of data within each 2D barcode.

The print system 1004 receives information related to the placement, size, shape, etc. of elements that comprise each 2D barcode. A device driver can be employed to facilitate this communication between the 2D barcode generator 1002 and the print system 1004. In one aspect, the device driver is a translator between the print system 1004 and applications employed by the 2D barcode generator 1002. In this manner, higher-level code can be written independently of the specific model of print system 1004. The device driver can convert general input/output instructions of the 2D barcode generator 1002 to specialized messages for consumption by the print system 1004. The protocols and standards for communication can vary in association with the type of print system 1004 and 2D barcode generator 1002. In one example, each version of the print system 1004 can require unique specialized commands.

Software applications run by the 2D barcode generator 1002 can access the print system 1004 by using high-level, generic commands, such as PRINTLN. Such generic statements can be converted into the low-level commands required by the print system 1004. In addition, the 2D barcode generator 1002 can run a software program to invoke a routine in the driver, wherein the driver issues commands to the print system 1004. Once the print system 1004 sends data back to the driver, the driver may invoke routines in the original calling program. The driver can also provide interrupt handling required for an asynchronous time-dependent hardware interface to the print system 1004.

The print system 1004 is representative of one or more devices that can output an image onto a substrate. The print system 1004 can be a toner-based printer, a liquid ink jet printer, a solid ink printer, a dye-sublimation printer or an inkless printer. In one embodiment, the print system 1004 is a toner-based laser printer that utilizes xerography to output documents. Toner is adhered to a light-sensitive print drum, wherein static electricity transfers the toner to a printing medium to which it is fused via heat and pressure. In another embodiment, the print system 1004 is an LED printer which uses an array of LEDs instead of a laser to cause toner adhesion to a print drum.

The print system 1004 can also be a solid ink printer. Solid ink printers employ solid sticks of cyan (C), magenta (M), yellow (Y) and black (K) colored ink, which are melted and fed into a piezo crystal operated print head. The print head sprays the ink on a rotating, oil coated drum. The paper then passes over the print drum, at which time the image is transferred, or transfixed, to the page. In yet another embodiment, the print system 1004 is a dye-sublimation printer that uses heat to transfer dye to a medium such as a plastic card, paper or canvas. The process generally lays one color at a time using a ribbon that has color panels. Dye-sublimation printers are intended primarily for high-quality color applications, including color photography.

In another approach, the print system 1004 is an inkless printer that uses paper with colorless dye crystals embedded between two outer layers of paper. When an imaging element within the printer is turned on, varying heat from the imaging element causes the crystals to colorize at different rates and become visible. Another inkless printer approach utilizes a reusable paper coated with a few micrometers of UV light sensitive chemicals. The printer employs a UV light bar that writes and erases the paper.

The print system 1004 can receive data from the 2D barcode generator 1002 to produce a document 1020 that includes other content such as an image 1022 and a 2D barcode 1030. Two metamerically matched colorants can be employed to print the image 1022 and the 2D barcode 1030 onto the document 1020. In one embodiment, the 2D barcode 1030 is created in similar appearance to a dot-peen printer wherein marked pixels are filled with a circular mark. The 2D barcode 1030 can be matched in both frequency and phase, as shown in FIG. 9(*d*) above, to insure that the dot peen marks are properly placed within each desired pixel.

The colorants utilized can have a zero degree sequential halftone fill structure of a pre-specified periodicity with a matched phase and frequency. Further, one of the two colorants can have a comparatively high level of (IR) light absorption. To accomplish this dichotomy, one colorant may have a K component whereas the other does not (K=0). In another approach, the K component of one colorant is much greater than the K component of the other colorant. In order to provide proper alignment, a halftone structure can be employed that is in the typical range for a particular 2D barcode standard (e.g., Data Matrix), such as 16×16 pixels for example. Such size can be viewed as a compromise between data compression in a digital front end (8×8 blocks are the basic compression unit in both lossy and lossless compression) and overall barcode size (e.g., 10 mm).

It is to be appreciated that color matches obtained by metameric pairs can be sensitive to printer calibration and drift, illumination changes, and/or observer differences. Thus, in the encoding process, a masking texture might be used by the print system 1004, or GCRs might be used that are not extremely different. Also, the print system 1004 can place metamers via a fixed halftoning scheme and searching for pairs in contone CMYK space. In one embodiment, binary dot patterns that exhibit the metameric property, but that do not necessarily arise from a single halftoning scheme, are derived directly. Finally, certain areas of images can facilitate hiding 2D barcode information. In one example, the print system 1004 can ascertain one or more preferred image locations for placing 2D barcode information.

The 2D barcode 1030 can be placed within the image 1022 via the print system to conceal such location or existence thereof. The 2D barcode 1030 is presented in a dashed line as it is not visible under a standard white light source. Once the document 1020 is exposed to the light source 1006, however, the 2D barcode 1030 is revealed, as discussed with reference to FIGS. 6 and 7 above. The light source 1006 can emit light in substantially any wavelength such as the infrared or ultraviolet spectrums. The wavelength of the light emitted from the light source 1006 can be selected from any number of commercially available light sources to reveal substantially any colorant combination metamers. Alternately, the wavelength of the light emitted from the light source 1006 can be adjusted to reveal substantially any colorant combination. A tuner (not shown) coupled to the light source 1006 can be utilized for this purpose.

In one example, the light source 1006 is a light emitting diode (LED) that emits light within the infrared light spectrum (e.g., greater than 800 nm) such as via a ring. Unlike incandescent, fluorescent and high intensity discharge sources, LEDs are near-monochromatic light sources. An individual LED can emit light in a particular wavelength range and is comparatively energy efficient. Table 2 illustrates exemplary LEDs and their respective wavelength of emission. In one example, one or more LED types are included in the decoding element 1008 to accommodate a wide array of metamer colorant pairs.

TABLE 2

| Color Name | Wavelength (Nanometers) | Semiconductor Composition |
| --- | --- | --- |
| Ultra Red | 660 | GaAlAs/GaAlAs |
| Super Red | 633 | AlGaInP |
| Super Orange | 612 | AlGaInP |
| Orange | 605 | GaAsP/GaP |
| Yellow | 585 | GaAsP/GaP |
| Pure Green | 555 | GaP/GaP |
| Super Blue | 470 | GaN/SiC |
| Blue Violet | 430 | GaN/SiC |
| Ultraviolet | 395 | InGaN/SiC |

In addition to LED technology, other methods exist for creating light such as lasers, interference or dichroic filters, and monochromators which create illumination at desired bandwidths using gratings or prisms.

Once the 2D barcode 1030 is revealed via the light source 1006, the decoding element 1008 is employed to determine the data contained therein. The decoding element is comprised of a reader and a processor. The reader can be employed to obtain the 2D barcode from the substrate. The processor identifies the standard used by the 2D barcode to encode the data and executes a routine that decodes the data contained therein as appropriate. In one embodiment, the reader is an IR camera such as a MicroScan HawkEye camera that can capture a 2D barcode. Once the 2D barcode 1030 is decoded, the data can be output from the system 1000 as a text string via the decoding element 1008.

Figure 11:
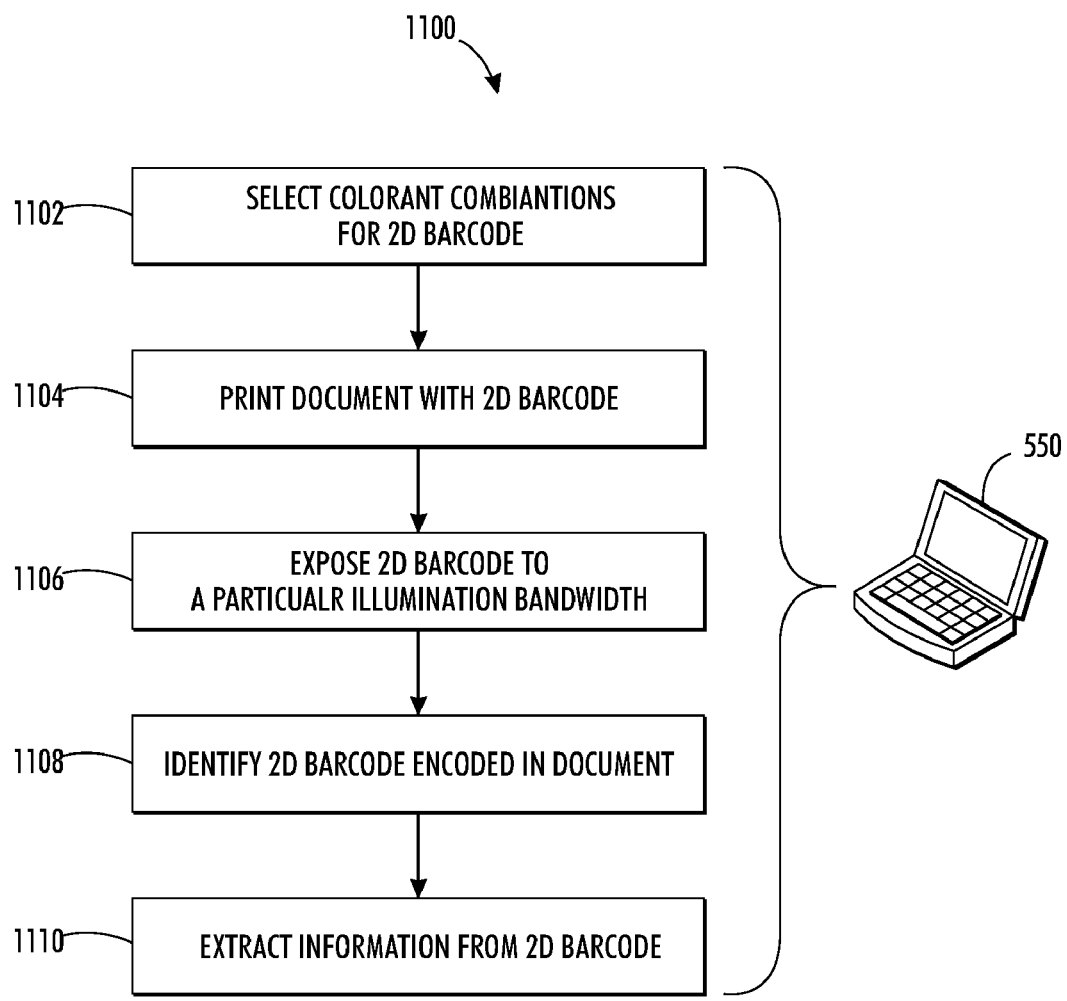
FIG. 11 illustrates a methodology to print, expose and extract information from 2D barcode, in accordance with an exemplary embodiment.

FIG. 11 illustrates a methodology 1100 utilized to place and extract information from a 2D barcode. At reference number 1102, a colorant combination is selected for placement of a 2D barcode. Selection of the colorant combinations can be dependent on a number of factors including matching colorants that are metameric pairs with other colorants. In one example, a metameric pair of colorants can be employed to place a 2D barcode and an image together in a document. The colorants can utilize a zero degree angle halftone fill structure wherein the frequency and phase for the halftone are matched for both inks. In addition, only one of the inks may have a K component. It should be obvious that the metameric pair of colorants may vary from one pixel in an image to the next pixel in order to maintain the appearance of the original image 1022.

It is to be appreciated that although the image is referenced herein as a single color, the image can be comprised of a plurality of colors that spatially vary from one another. In such cases, the colorants selected for the 2D barcode can vary dependent on placement of the 2D barcode respective to the image. In one example, the image has four disparate colorant combinations within the space that the 2D barcode is placed. The colorant combinations of the 2D barcode can vary to form metameric pairs with each of the four image colorants, dependent on placement thereof. A decoder used to reveal the 2D barcode can have one or more peak wavelength outputs (e.g., via a plurality of LEDs) to accommodate the various metameric pairs associated therewith.

At 1104, a document is printed with a 2D barcode that utilizes the colorant combinations selected from step 1102. The 2D barcode can be printed as set forth in FIG. 9(*d*) above, wherein the dots are matched in both frequency and phase to desired pixels within the barcode area. In one example, the document is printed utilizing a four color CMYK printing system, wherein the 2D barcode resembles a dot-peened mark with partially filled pixels. The printing system can place the 2D barcode with a first colorant combination into an image with a second colorant combination. The second colorant combination can vary from the first colorant combination based on a gray component replacement technique wherein a large disparity between K components of each colorant exists, as discussed herein.

At 1106, the 2D barcode printed at 1104 is exposed to illumination at a particular bandwidth (e.g. greater than 800 nm) and can be emitted from a light emitting diode, in one example. The illumination can be selected take advantage of the dot-peened structure of the 2D barcode, wherein a maximum contrast level is obtained. The particular bandwidth illumination is related to the colorant combinations utilized to print the image and 2D barcode onto the document. The colorant combinations utilized for the image non-2D barcode region and the 2D barcode region within the image are metamers. In this manner, the particular bandwidth illumination reveals the 2D barcode. In order to affect the revelation of the 2D barcode, the particular bandwidth illumination is adjusted to specifically differentiate metameric colorant combinations utilized for placement of the 2D barcode. Once the 2D barcode is exposed at 1106, it is identified at 1108 and information from the identified 2D barcode is extracted at 1110.

A computer 550 illustrates one possible hardware configuration to support the systems and methods described herein, including the system 1000 and the method 1100 above. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 550 can include a processing unit (not shown), a system memory (not shown), and a system bus (not shown) that couples various system components including the system memory to the processing unit. The processing unit can be any of various commercially available processors. Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer 550 can further include a hard disk drive, a magnetic disk drive, e.g., to read from or write to a removable disk, and an optical disk drive, e.g., for reading a CD-ROM disk or to read from or write to other optical media. The computer 550 typically includes at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer 550 can be any of a number of commercially available operating systems.

A user may enter commands and information into the computer through a keyboard (not shown) and a pointing device (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus ("USB"), an IR interface, etc.

A monitor, or other type of display device, is also connected to the system bus via an interface, such as a video adapter (not shown). In addition to the monitor, a computer typically includes other peripheral output devices (not shown), such as speakers, printers etc. The monitor can be employed with the computer 550 to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer 550 via any wireless or hard wire protocol and/or standard.

The computer 550 can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Although LEDs have been discussed for use as a detection illumination source, it is to be understood that such LEDs are not required. It is assumed that selected particular bandwidth illumination sources are best in bringing out spectral differences between metamers. However, various disparate light sources such as fluorescent light sources can also be employed as well as lasers, or light filtered with dichroic filters, prisms, or gratings. Light sources in scanners or color sensors with particular bandwidth illumination can also be employed.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system to reveal a 2D barcode in a document, comprising:
 a 2D barcode generator that selects a placement and at least one colorant combination of an image and at least one colorant combination for a 2D barcode on a document, where the at least one colorant combination of the image and the 2D barcode form a metameric pair;
 a print system that receives data from the 2D barcode generator and places the image and the 2D barcode on the document;
 a light source selected or tuned to a wavelength corresponding to the colorant combinations utilized by the print system to reveal the 2D barcode placed thereon; and
 a decoding element that decodes and extracts data from the revealed 2D barcode.

2. The system according to claim 1, wherein the at least one colorant combination of the image is created using a periodic halftoning structure.

3. The system according to claim 2, wherein the 2D barcode is a peen-type barcode that comprises of a plurality of barcode elements, the periodic halftoning structure matches the phase and periodicity of the barcode.

4. The system according to claim 3, where the frequency matching between halftoning structure and barcode is done by a halftone structure of integer multiples of the frequency of the barcode elements.

5. The system according to claim 1, wherein each pixel of the 2D barcode that comprises the 2D barcode is square and, if marked, are filled via a substantially circular dot that covers a majority of the area of each pixel.

6. The system according to claim 1, wherein the light source emits light in an infrared spectrum.

7. The system according to claim 1, wherein the colorant combination of one of the image and dots that form the 2D barcode is created with the minimum allowable black for gray color replacement and the colorant combination of the other of the image and the dots that form the 2D barcode is created with the maximum allowable black for gray color replacement.

8. The system according to claim 1, wherein of the colorant combinations for the image or the 2D barcode does not contain a black component and wherein the colorant combination of the other of the image or 2D barcode dots contains a black component.

9. The system according to claim 1, wherein the SPD of the illumination source is concentrated in one or more wavelength bands within which the difference between the reflectance spectra of the metameric pair is most pronounced, so as to produce optimal distinction.

10. The system according to claim 1, wherein the decoder is an image acquisition device that captures an electronic image of the document enabling the 2D barcode to be revealed.

11. The system according to claim 1, wherein the printing system directly derives pairs of binary dot patterns that exhibit a metameric property when printed.

12. The system according to claim 11 wherein the pairs of binary dot patterns have a zero degree fill structure.

13. The system according to claim 1, wherein the frequency and phase of the pairs of binary dots are matched.

14. A method to decode a printed 2D barcode, comprising:
deriving at least one colorant combination of an image and at least one colorant combination for dots within a 2D barcode on a document, where the at least one colorant combination of the image and the dots of the 2D barcode form a metameric pair;
printing the image and the 2D barcode onto a document;
exposing the 2D barcode to a particular bandwidth light source with a spectral power distribution that maximizes the visual distinction between the image and the dots of the 2D barcode; and
utilizing said visible narrow band illumination to decode the exposed 2D barcode generated from the image.

15. The method according to claim 14, wherein the colorant combination of the image does not include a black component and the colorant combination used for the dots within the 2D barcode includes a black component.

16. The system according to claim 14, wherein the at least one colorant combination of the image is created using a periodic halftoning structure.

17. The system according to claim 14, wherein the 2D barcode is a peen-type barcode that comprises of a plurality of barcode elements, the periodic halftoning structure matches the phase and periodicity of the barcode.

18. The method according to claim 14, wherein printing is accomplished via placement of pairs of binary dot patterns that exhibit a metameric property, which have a zero degree fill structure, wherein the frequency and phase of the pairs of binary dots are matched.

19. The method according to claim 14, wherein information is extracted from the 2D barcode subsequent to the reveal of the 2D barcode via the narrow band illumination.

20. A method for generating a printed 2D barcode, comprising:
selecting at least one CMYK colorant pattern for printing that includes a comparatively strong black component;
deriving a second CMYK colorant pattern, which does not include a black component or only a comparatively weak black component, with the property of appearing substantially similar to the first pattern under broadband illumination, but distinct from the first pattern under a selected bandwidth illumination; and
printing the two colorant patterns in close spatial proximity to produce a 2D barcode that is concealed under broadband illumination and revealed under the selected bandwidth illumination, the first and second colorant patterns are printed via a zero degree fill structure and a matching frequency and phase.

* * * * *